United States Patent

Tsutaki et al.

Patent Number: 6,014,286
Date of Patent: Jan. 11, 2000

[54] MAGNETIC HEAD HAVING A DIE-MOLDED CONDUCTIVE RESIN HEAD BASE

[75] Inventors: Shoji Tsutaki; Hiroshige Yamaki, both of Kanagawa-ken, Japan

[73] Assignee: Kabushiki Kaisha Toshiba, Japan

[21] Appl. No.: 08/161,869

[22] Filed: Dec. 6, 1993

Related U.S. Application Data

[63] Continuation of application No. 07/808,638, Dec. 17, 1991, abandoned.

[30] Foreign Application Priority Data

Dec. 19, 1990 [JP] Japan ................................... 2-403523
Apr. 30, 1991 [JP] Japan ................................... 3-098986

[51] Int. Cl.$^7$ .................................................. G11B 5/53
[52] U.S. Cl. ........................... 360/84; 360/107; 360/104
[58] Field of Search ................................. 360/75–77.01, 360/77.12–78.03, 83–85, 95, 104–109, 130.2, 130.24, 96.1, 125, 126

[56] References Cited

U.S. PATENT DOCUMENTS

| | | | |
|---|---|---|---|
| 4,237,603 | 12/1980 | Crow | 29/623.4 |
| 4,285,017 | 8/1981 | Arter et al. | 360/109 |
| 4,509,084 | 4/1985 | Fujioka et al. | 360/107 |
| 4,641,214 | 2/1987 | Imanishi et al. | 360/84 |
| 4,839,762 | 6/1989 | Yoneda et al. | 360/107 |
| 4,897,745 | 1/1990 | Binder-Kriegelstein | 360/109 |
| 4,939,606 | 7/1990 | Nakanishi | 360/107 |
| 4,985,797 | 1/1991 | Yohda et al. | 360/125 |
| 5,023,734 | 6/1991 | Tamaki | 360/84 |
| 5,050,024 | 9/1991 | Nanjyo | 360/109 |
| 5,065,267 | 11/1991 | Yohda | 360/109 |
| 5,075,809 | 12/1991 | Heinz et al. | 360/84 |
| 5,084,798 | 1/1992 | Gleissner et al. | 360/128 |
| 5,115,299 | 5/1992 | Wright | 357/72 |
| 5,157,245 | 10/1992 | Shigeno et al. | 360/104 |
| 5,251,087 | 10/1993 | Sakashita et al. | 360/104 |

FOREIGN PATENT DOCUMENTS

| | | | |
|---|---|---|---|
| 0185844 | 7/1986 | European Pat. Off. . | |
| 0256269 | 2/1988 | European Pat. Off. . | |
| 0288321 | 10/1988 | European Pat. Off. . | |
| 3421219 | 12/1985 | Germany . | |
| 3729168 | 3/1988 | Germany . | |
| 59-36361 | 2/1984 | Japan | 360/84 |
| 62-207313 | 9/1987 | Japan . | |
| 63-46615 | 2/1988 | Japan | 360/107 |
| 1-042004 | 2/1989 | Japan . | |
| 195158 | 4/1989 | Japan . | |
| 2-161605 | 6/1990 | Japan . | |
| 798928 | 7/1958 | United Kingdom | 360/84 |

OTHER PUBLICATIONS

IBM Technical Disclosure Bulletin; May 1975; vol. 17, No. 12; Primavera et al.

*Primary Examiner*—Jefferson Evans
*Attorney, Agent, or Firm*—Pillsbury Madison & Sutro LLP

[57] ABSTRACT

A magnetic head has a head chip comprising a magnetic substance. A die-molded head base is formed from a conductive resin material, and the head base has a housing envelope for the head chip formed therein. The head chip has at least a portion thereof buried within the housing envelope.

12 Claims, 9 Drawing Sheets

MAGNETIC HEAD HAVING A DIE-MOLDED CONDUCTIVE RESIN HEAD BASE

This is a continuation of application Ser. No. 07/808,638, filed on Dec. 17, 1991 abandoned.

BACKGROUND OF THE INVENTION

1. Field of the Invention

The present invention relates to a magnetic head used for rotary head of a video tape recorder or the like and a head apparatus assembled by using the magnetic head.

2. Description of the Related Art

Figure 11:
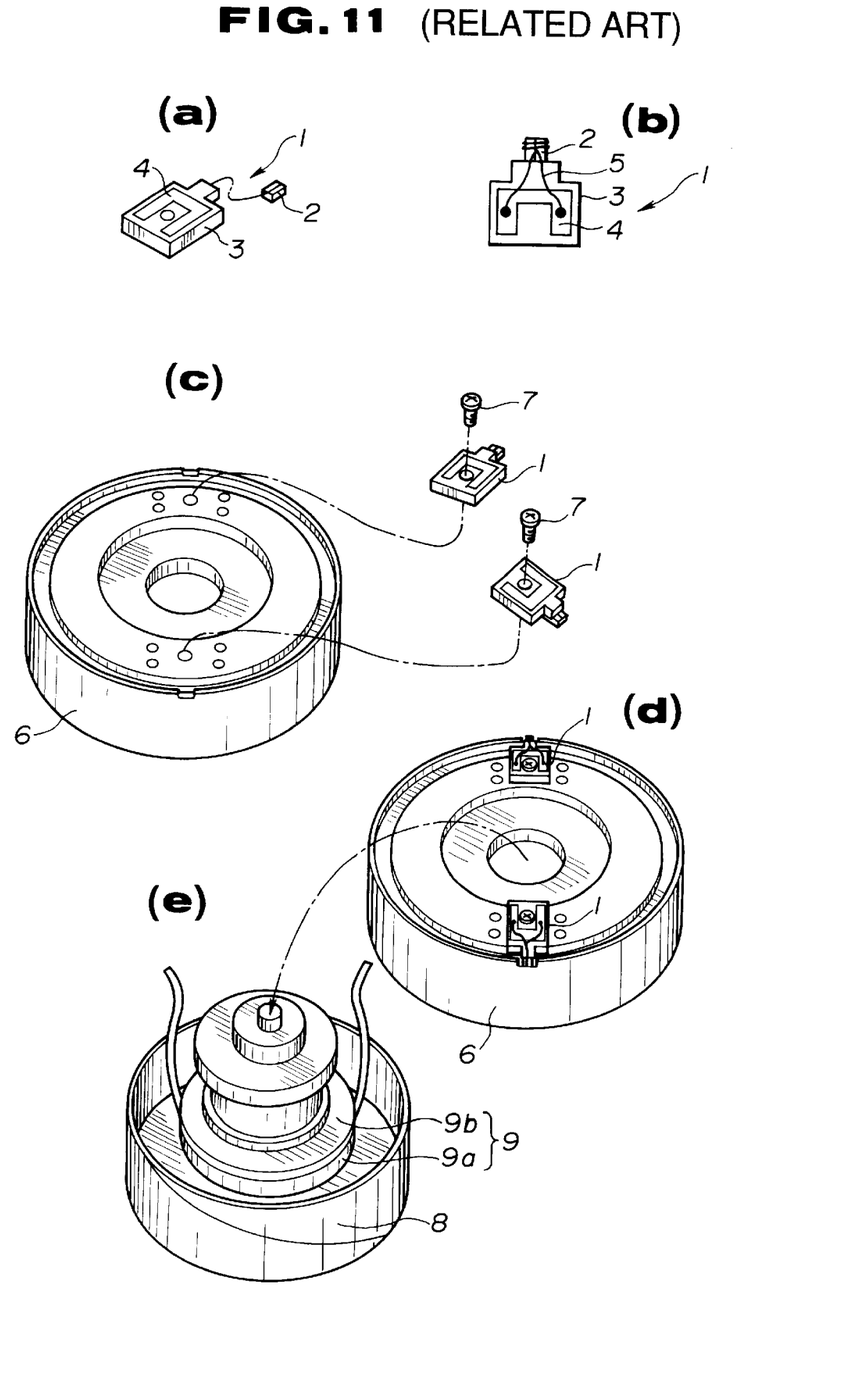
FIGS. 11(a)–11(e) is a perspective view showing a conventional magnetic head and a head apparatus using the magnetic head.

As shown in FIGS. 11(a) and 11(b) the conventional structure of a magnetic head 1 used for a video tape recorder (VTR) comprises a head chip 2 consisting of magnetic substances bonded to a brass head base 3, and a wire wound around the head chip. A terminal strip 4 is bonded to a surface of the head base 3, and an end of a winding member 5 is soldered to the terminal strip 4. The magnetic head 1 is assembled in this way and fixed to a surface of an upper drum 6, which forms one of the rotary drums, with a screw 7 as shown in FIG. 11(c). The fixed condition is shown in FIG. 11(d). FIGS. 11(c) and (d) illustrate rotary drums with two heads. The upper drum 6, assembled as shown in FIG. 11(d), is fitted into a lower drum 8, a rotary portion being formed in the center of the lower drum 8 as shown in FIG. 11(e). A rotary transformer 9 is composed of a fixed side core 9a and a rotary side core 9b disposed under the rotary portion. Wires are wound around each core 9a and 9b. The side of the magnetic head 1 and a side of a recording and/or reproducing circuit (not illustrated) are electro-magnetically coupled through the rotary transformer 9.

Figure 12:
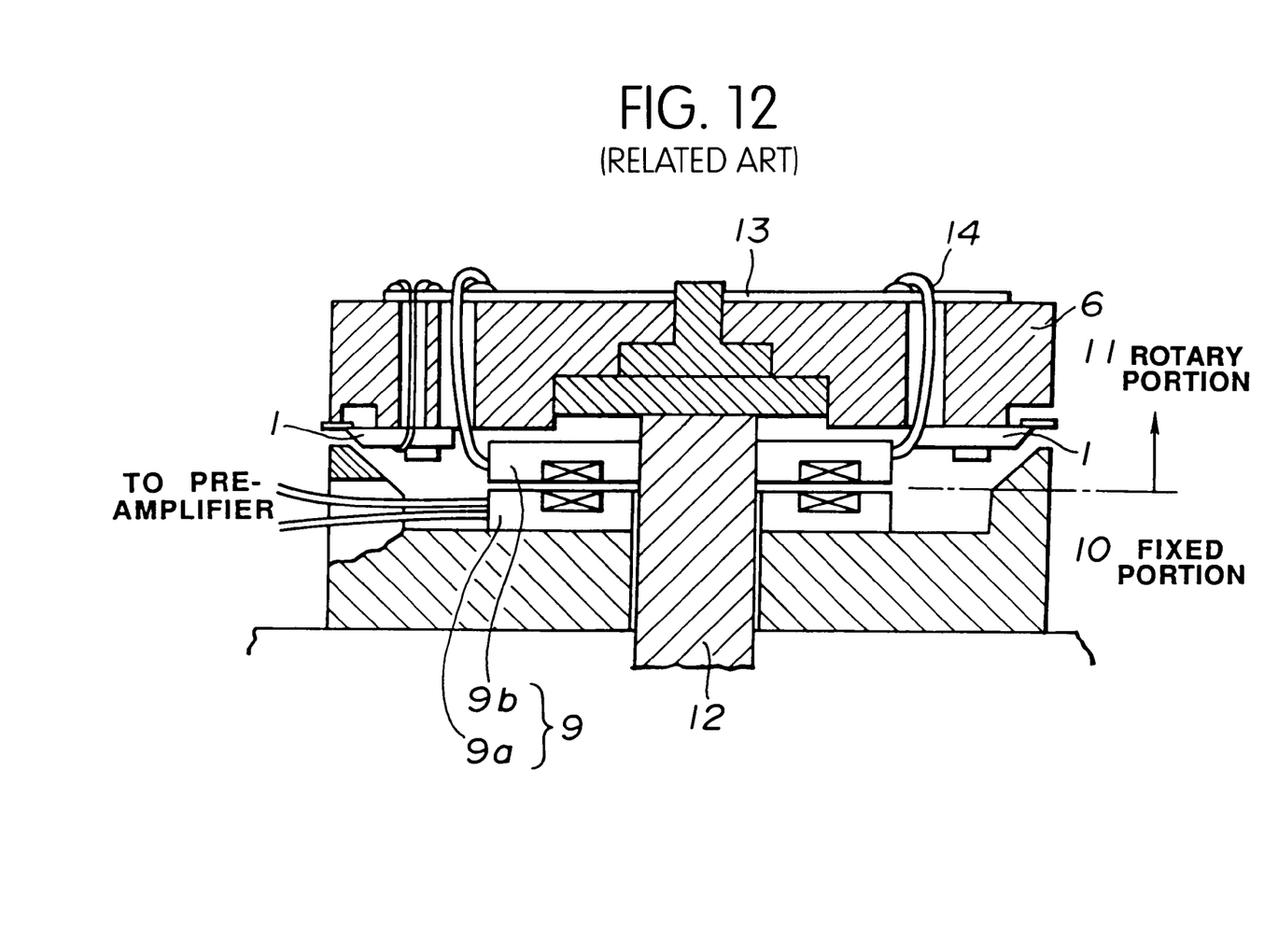
FIG. 12 is a sectional view showing a conventional head apparatus.

FIG. 12 shows the coupled condition of the upper drum 6 and the lower drum 8. In FIG. 12, reference numeral 10 represents a fixed portion, while numberal 11 represents a rotary portion. The upper drum 6 on the side of the rotary portion 11 is fixed to the tip of a rotary axis 12 and rotated by rotation driving means (not illustrated). Also, a printing base 13 is fixed on the upper surface of the upper drum 6. A coil on the rotary side of the rotary transformer 9 is connected to the printing base 13 with a wire 14.

Individual brass head base 3 is produced by die formation in the above mentioned conventional magnetic head 1. When the magnetic head 1 is assembled, a separate head chip 2 is combined with the head base 3. Therefore, the brass head base 3 also serves as a jig during the manufacturing processes, which include bonding the head chip 2 to the head base 3, winding wires, molding, and a curvature finishing of a chip sliding surface. Then, when the single magnetic head 1 is carried, a special housing case is needed so that it is not damaged. It is recognized that video tape recorder are now being integrated with a camera therefore, there exists a need to make the video tape recorders smaller and lighter so that they can be easily transported. Also, it has become necessary for the head base used for a small-sized video tape recorder to be made smaller lighter as a matters of course. There is also a need, however, for the head base structure to be manufactured with high precision and processability.

For example, since a 8 mm VTR integrated with a camera has a small diameter of a rotary drum cylinder typically 30 mm and event less, the size of the head base should be smaller as a matter of course.

Since the brass base has a relatively high thermal conductivity coefficient, adjacent solder melts because of the heat transferred therethrough from, for example, a glass epoxy base bonded to the brass base, when an end of a wire is soldered to a terminal strip. Thus, there is a problem in that a soldering iron cannot be pressed for a long enough time for effective soldering.

Also, when a flying erase head, used for erasing a recording on a video tape and eliminating noise (called rainbow noise), is fitted to a rotary drum, a dummy base of the same weight must be positioned on a diagonal line in order to keep the weight balanced when the rotary drum is rotated.

While, instead of metal brass, ceramic material and plastic material have been investigated as a material for the base board; however, ceramic material is hard to be processed and has a high cost, while plastic material has weak weatherability and mechanical strength and change has a large thermal expansion coefficient 3 and poor heat stability. As a result, although plastic material is light, material it can not take the place of brass. Also, generally, a chip and base board require grounding to prevent electrification in the head chip. For this additional reason, ceramic and plastic materials cannot be used.

Further, since it is difficult for bonding agents to penetrate through conventional base board materials when the head chip is bonded to the head base, the bonding strength of the chip is weak.

As explained above, due to the base board materials, a conventional magnetic head has many problems associated its manufacturing processes, chip bonding strength, portability, and solderability. There is also a problem in that the magnetic head is unsuitable for miniaturization and reducing the weight thereof.

SUMMARY OF THE INVENTION

A purpose of the present invention is to improve a base board material and to provide a magnetic head and a head apparatus which can be used to miniaturize its size and reduce its weight.

Another object of this invention is to provide a magnetic head and a head apparatus which can remove problems associated with the manufacturing process, for example, processability, chip bonding strength, portability and solderability.

That is, a magnetic head of the first invention is characterized in that conductive resin materials are used for the head base used in fixing a head chip.

A magnetic head of the second invention is characterized in that the head base used in fixing a plurality of head chips is molded as an unit by using conductive resin materials.

A head apparatus of the third invention is assembled by disposing magnetic head where a head chip is fixed on a head base which is composed of conductive resin materials on a rotary drum.

DETAILED DESCRIPTION OF THE PREFERRED EMBODIMENTS

Figure 1A:
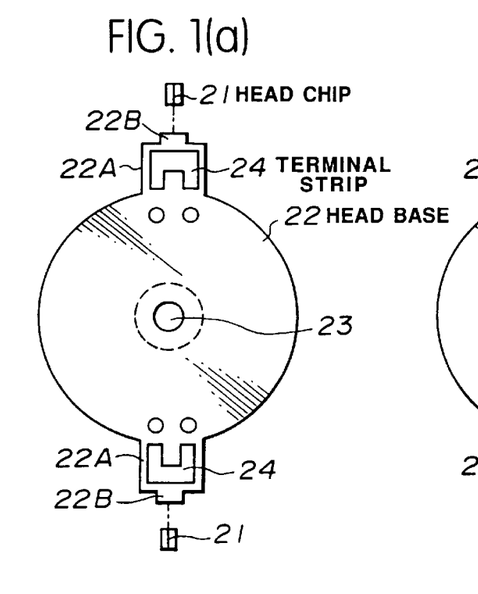
FIGS. 1(a)–1(d) is a plan view showing a magnetic head of the first embodiment of this invention.
Figure 1B:
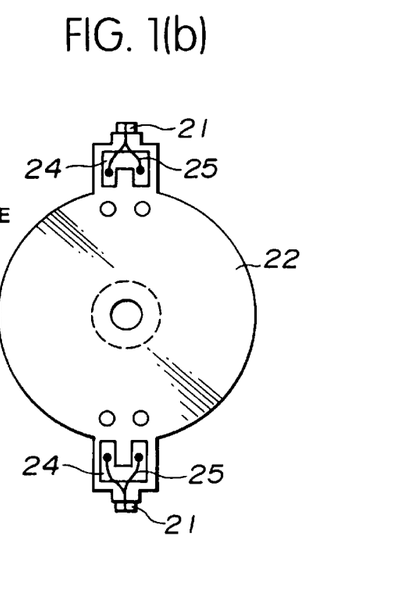
Figure 1C:
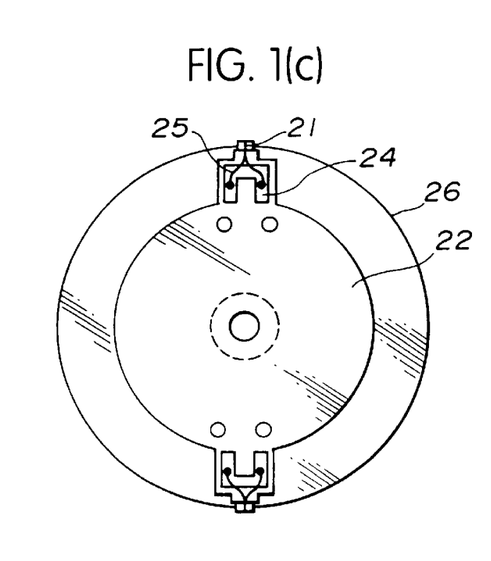
Figure 1D:
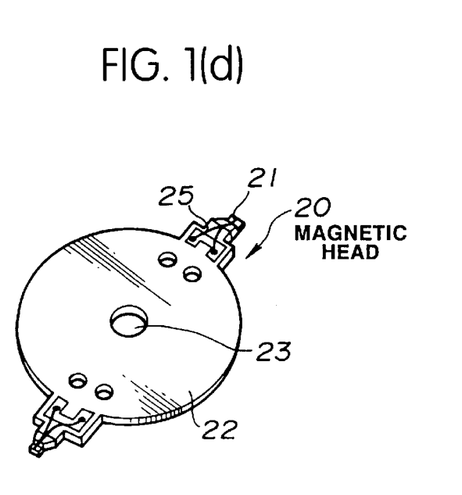
Figure 2A:
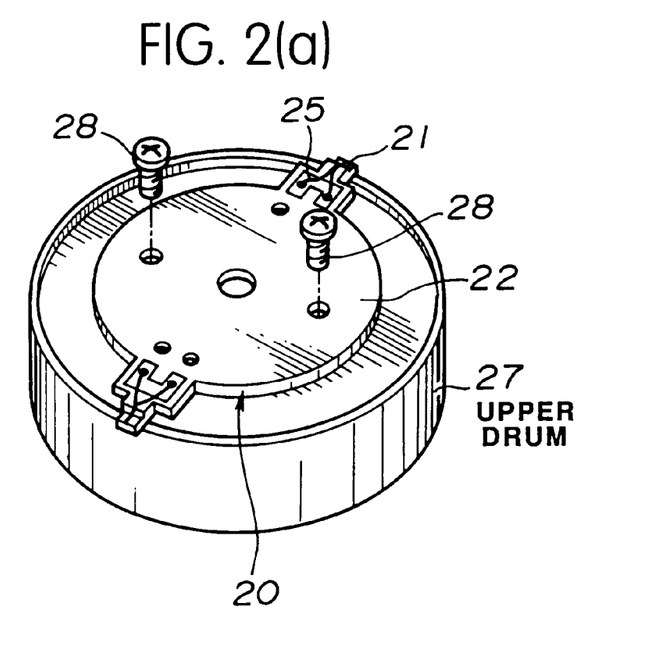
FIGS. 2(a)–2(b) is an exploded perspective view showing a head apparatus using a magnetic head of the first embodiment.
Figure 2B:
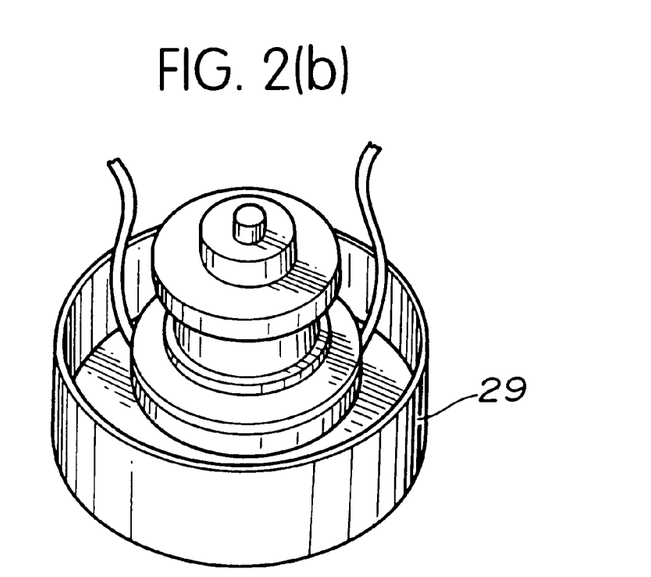
Figure 3:
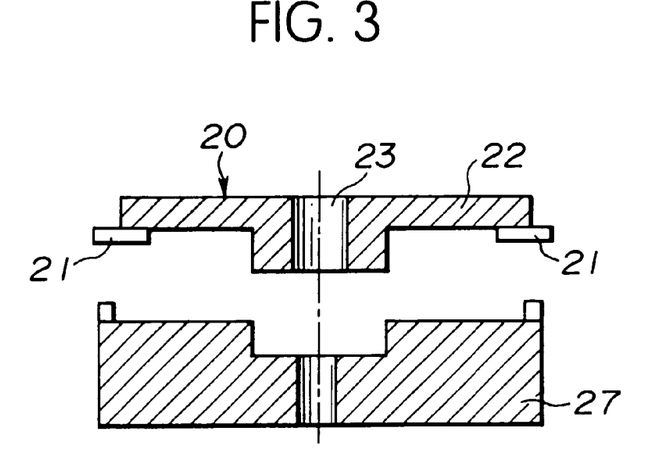
FIG. 3 is an exploded sectional view showing a head apparatus using a magnetic head of the first embodiment.

FIGS. 1, 2 and 3 are process drawings showing a manufacturing process of a magnetic head in the first embodiment of this invention.

In FIG. 1(a), a head chip shown by a reference numeral 21 is produced by joining a pair of core half substances (magnetic substance) between which a gap portion is sandwiched. A head base 22 is an injection molded product shaped like an approximate circle so as to fit the shape of a rotary drum. Two base portions 22A are provided on the head base 22 and project from the circumference of the circuler head base. Thus, the head base 22 is used for two heads. Further, a chip bonding portion 22B projects from each base portion 22A. A hole 23 which fits the rotary axis of the rotary drum is formed in the center of the head base 22. Terminal strips 24 are bonded on the surfaces of the above mentioned two base portions 22A, respectively. The above mentioned head base 22 is molded by injection molding materials formed from conductive resin materials. For example, as described in the Gazette of Japanese Patent Laid Open No. 207313/1987, the molding materials are comprised of the following materials:

- (A) thermosetting resin (such as epoxy resin) constituting 14–40 percent of the molding material by weight, including a hardening agent, hardening accelerator and catalyst;
- (B) globular carbon and/or globular black lead having a diameter of 5–150 μm, and constituting 10–85 percent of the molding material by weight; and
- (C) inorganic filler constituting 5–56 percent of the molding material by weight, which uses an inorganic fiber having a grain diameter of 50 μm or less or a fiber length of 1 mm or less. The inorganic filler corresponds to fine powders such as silica, $CaCO_3$ and glass bead or layer inorganic compound groups. For the layer inorganic compound groups, at least one of clay including montmorillonite, hectorite and hydrohalloysite, sulfide such as thallium sulfide, phosphate such as zirconium hydrogenphosphate, and halide such as ferric oxychloride can be used. Also, as the molding materials, thermoplastic resin as described in the Gazette of Japanese Patent Laid Open No. 95158/1989 can be used.

The head chip 21 is bonded on the surface of each chip bonding portion 22B. As shown in FIG. 1(b), a wire 25 is wound around the head chip 21, and an end of a wire 25 is soldered to the terminal strip 24.

Next, as shown in FIG. 1(c), the magnetic head of FIG. 1(b) is attached to a jig 26 for tape lapping (cylinder for processing), so as to lap the head chip 21 (finishing of the sliding surface) for tape. A finished magnetic head 20 is shown in FIG. 1(d).

The magnetic head 20 in FIG. 1(d) is fixed, with a screw 28, on a surface of an upper drum 27 as shown in FIG. 2(a). FIG. 3 shows the side section before fixing the magnetic head 20 to the upper drum 27. Then, the upper drum 27 in FIG. 2(a), on which the magnetic head 20 is screwed is fitted to a rotary portion in a lower drum 29 in FIG. 2(b).

Figure 4:
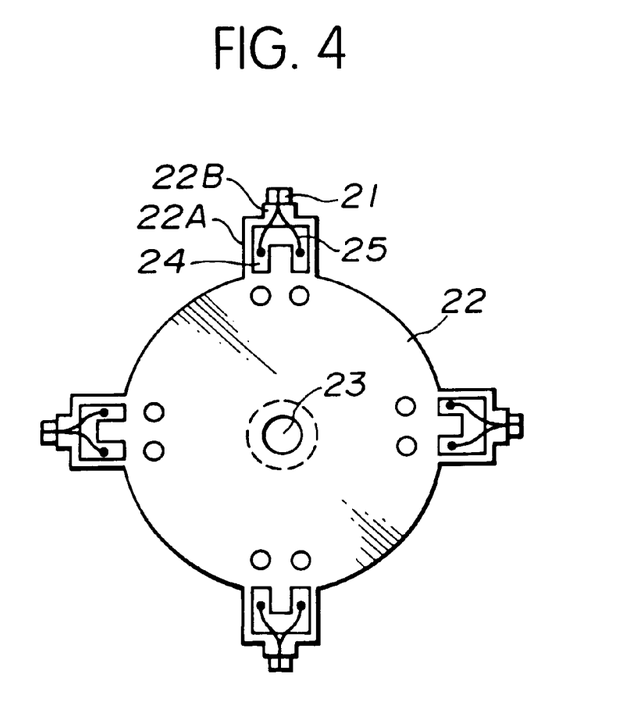
FIG. 4 is a plan view of a modification of the first embodiment.

FIG. 4 shows a modification of the first embodiment. In this modification, the head base four channel heads. In FIG. 4, a head base 22 having four base portions 22A is produced by injection molding and the head chip 21 is bonded to a tip portion 22B of each base portion 22A. Then, after a wire 25 is wound around the head chip 21, the end of the wire 25 is soldered to the terminal strip 24 bonded to each base portion 22A of the head base 22.

Figure 5A:
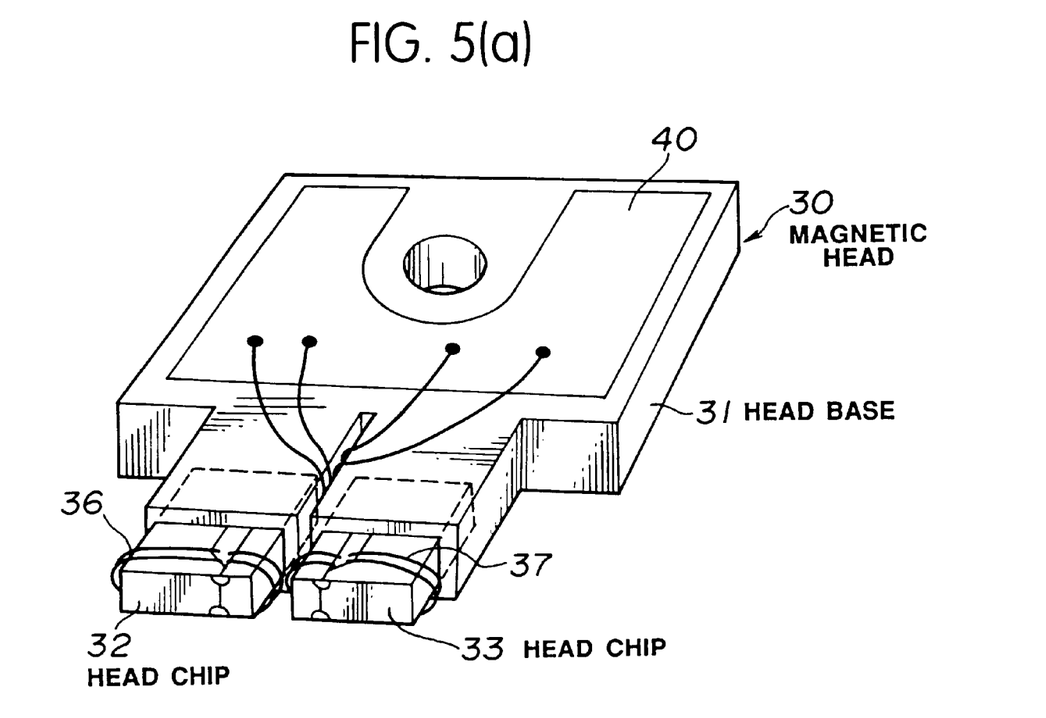
FIG. 5(a) shows a front view of a magnetic head of the second embodiment of this invention, while FIG.(b) shows a plan view thereof.
Figure 5B:
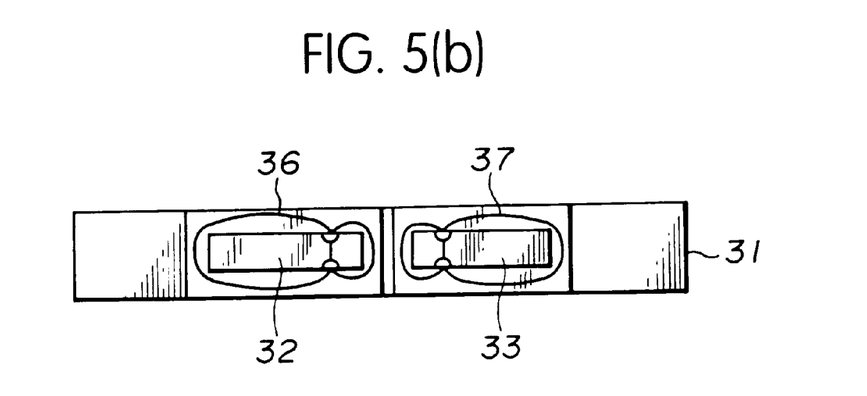

FIG. 5 shows the magnetic head of the second embodiment of this invention. FIG. 5(a) is a perspective view and FIG. 5(b) is a front view.

This embodiment has a double azimuth magnetic head where two head chips are arranged on a base. In the magnetic head 30 in FIG. 5, two housing portions are provided in head base 31, which has previously been formed from conductive resin materials, and head chips 32 and 33, without winding wires, are buried in the housing portions and fixed. As a fixing method for fixing the head chips 32 and 33 in the housing portions of the head base 31, each head chip is pressed and fitted to the housing portions. Alternatively, or an adjacent portion of the housing portions is heated and the head chip are fixed after each head chip is fitted into the housing portion.

Also, when the head base 31 is produced by injection molding, the head chips 32 and 33 can be held in a die (the die temperature being approximately 200° C.) and molded to the head base as an unit, rather than fitting the head chips 32 and 33 into the housing portions after the head base 31 has hardened. That is, if conductive resin materials are injected and molded after the head chips 32 and 33 are held in a predetermined positions in the die, the head chips 32 and 33 are fitted to the head base 31 at hardening thereof. Thus, a chip bonding process is no longer needed. Then, winding members 36 and 37 are wound around the head chips 32 and 33 and the ends of the members 36 and 37 are soldered to a terminal strip 40 on the head base 31.

Figure 6A:
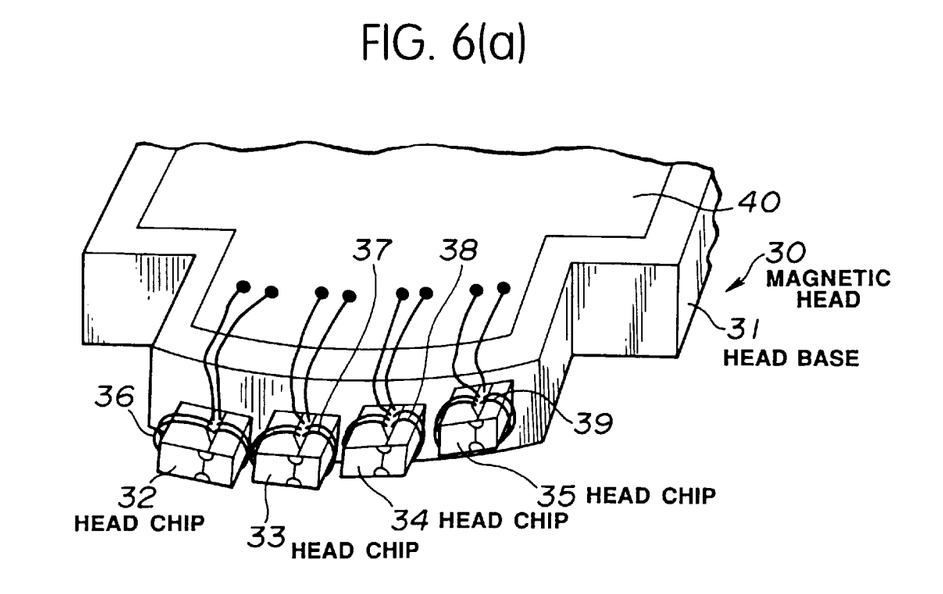
FIGS. 6(a)–6(b) shows a modification of the second embodiment shown in FIG. 5(a)–5(b).
Figure 6B:
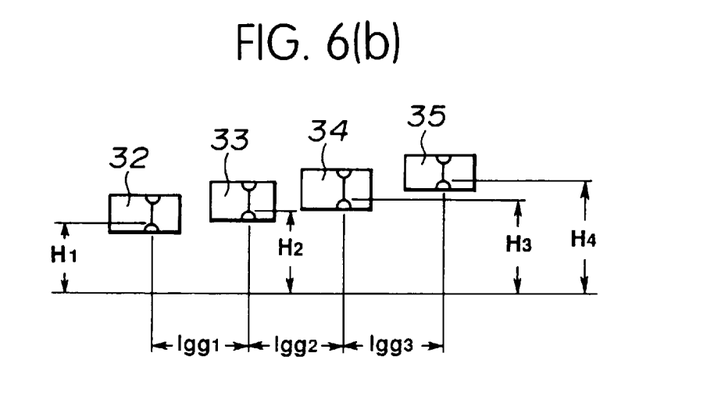

FIG. 6 shows a modification of the second embodiment. FIG. 6(a) is a perspective view and FIG. 6(b) shows the relationship of the positions between the horizontal and height directions of four head chips.

In this modification, the second embodiment is applied to four channel heads for broadcasting VTR. In FIG. 6, four housing portions are provided in the head base 31, which is previously formed from conductive resin materials. In the four housing portions, four head chips 32, 33, 34 and 35 are buried and fixed. The method of fixing the head chips 32–35 in the housing portions of the head base 31 is the same method as that described for FIG. 5. Each head chip is pressed and fitted into the housing portions, or, alternatively, an adjacent portion of the housing portion is heated and fixed after each head chip is fitted into its respective housing portion.

Also, as with FIG. 5, when the head base 31 is molded by injection, the head chips 32–35 are held in a die and can be molded as an unit at the same time. That is, conductive resin materials are injected and molded, so that the head base 31 is produced. However, if the head base is molded by injection after the head chips 32–35 are held in predetermined positions in the die, the four head chips 32–35 are fitted to the head base 31 at the time of hardening. After that, winding members 36, 37, 38 and 39 are wound around the four head chips 32–35, respectively, and the ends of the members 36–39 are soldered to the terminal strip 40. In this case, when each head chip 32–35 is buried and formed, the determination of heights H1 H2, H3 and H4 from the base of each chip and gap intervals between each chip $1_{gg1}$, $1_{gg2}$ and $1_{gg3}$ makes it possible to fit the chip into the base 31 and, at the same time, to arrange the position of each fitted chip.

Figure 7A:
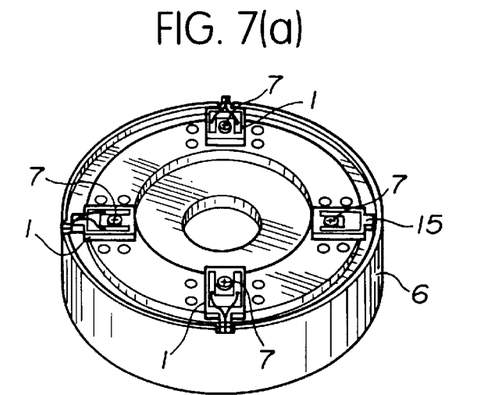
FIGS. 7(a)–7(c) is a perspective view showing the third embodiment of this invention.
Figure 7B:
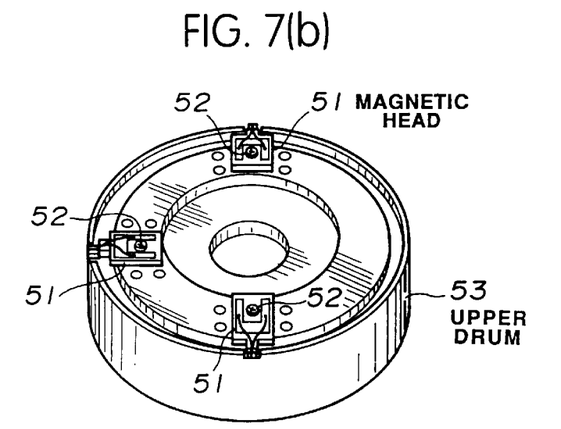
Figure 7C:
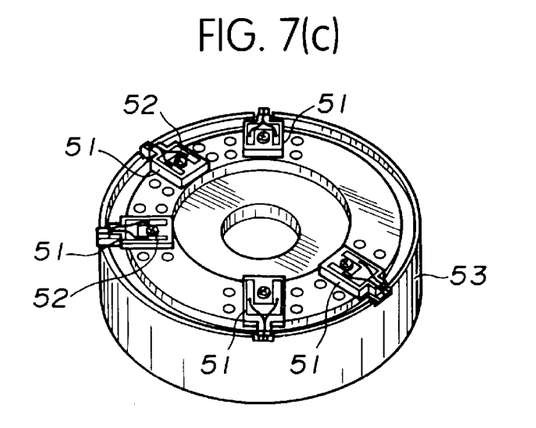

In FIG. 7(A)–7(c), the third embodiment of this invention, wherein an odd number of heads are formed on the rotary drum, is illustrated. FIG. 7(a) shows a conventional magnetic head using a brass base, fitted on the upper drum. FIGS. 7(b) and (c) show the condition in which a discrete magnetic head using base materials formed from conductive resin materials, as explained in the first embodiment, is fitted on the upper drum.

As shown in FIG. 7(a), when three conventional magnetic heads 1 are fitted on the upper drum 6, the three magnetic heads 1 are disposed at 90° intervals from the center of the drum. Further, in order to make the drum keep a rotary balance, a dummy base 15 is fixed to the drum with screw 7. In contrast, since magnetic head 51 in FIG. 7(b) user base materials formed from conductive resin materials, it has about ⅕ of the weight of the former head, and it is not necessary to use the dummy base for balancing when the head 51 is fixed on the upper drum 53 with a screw 52. Similarly, in a case of five heads, the dummy base for balancing is not needed as shown in FIG. 7(c).

Also, in FIG. 7, when the head base is formed as an unit in order to attach a plurality of magnetic heads on a head base as shown in the embodiment in FIG. 1, a dummy base portion and the head base 22 can be molded as an unit at molding.

According to the embodiments mentioned above, the use of conductive resin materials for the head base reduces the weight of the head base to about ⅕ of a conventional head base and especially makes a VTR apparatus lighter when a plurality of magnetic heads are used. Also, because synthetic resin is used, injection molding can be performed, so that a complex-shaped base board can be produced with high precision. Therefore, when positions of a plurality of heads having different head heights such as a magnetic head for broadcasting are determined, the positions can be determined by a casting with precision. Also, the position in the horizontal (circumference) direction between the heads can be determined with precision at molding. Further, the base materials used for the above mentioned embodiments have low thermal conductivity. Accordingly, when a lead wire connected with a rotary transformer is soldered to the terminal strip on the base, the adjacent portion does not melt and the production efficiency is good. Also, since conductive molding materials are used, a head chip which needs to prevent electrification can be electrically connected to the head base. In addition, because the material has a light weight, when an odd number of heads are disposed on the drum as in the case when a flying erase head is used, a dummy base for balancing is not required. Also, when a dummy is needed, the dummy base can be formed at the same time of the molding.

Figure 8:
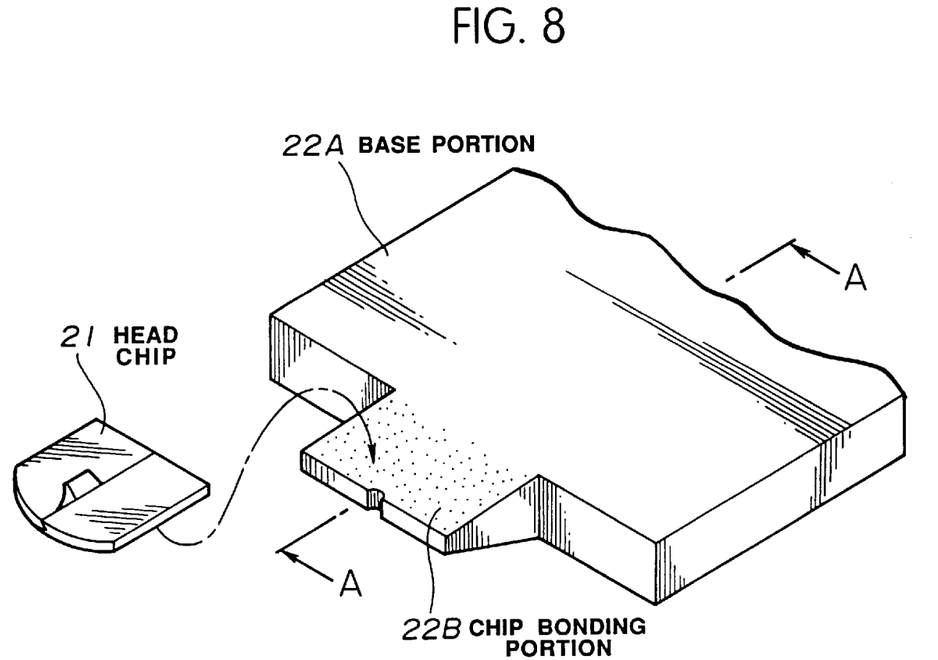
FIG. 8 is a perspective view showing a chip bonding portion of a magnetic head of the fourth embodiment of this invention.
Figure 9:
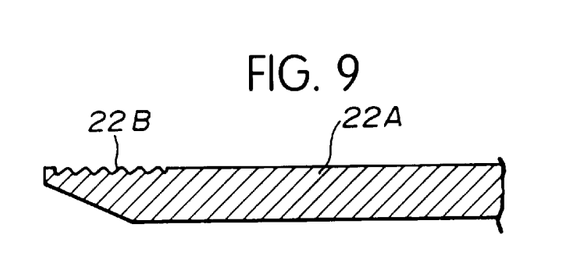
FIG. 9 is a sectional view taken on the line A—A in FIG. 8.
Figure 10:
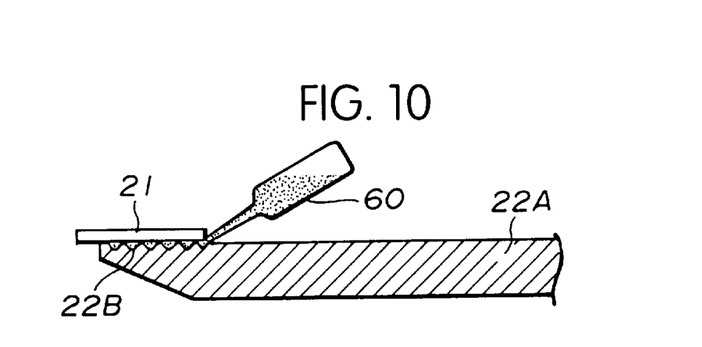
FIG. 10 is a side and sectional view showing a chip bonding method.

FIG. 8 is a perspective view showing a chip bonding portion on a magnetic head of the fourth embodiment of this invention. FIG. 9 is a sectional view taken on the line A—A in FIG. 8. FIG. 10 is a side and sectional view showing a chip bonding method.

In this embodiment, when the head chip 21 is bonded on the conductive head base 22 formed by injection molding. The weak chip bonding strength, which is a drawback of plastic, can be made stronger and the conductivity of the bonding portion can be made better provided that the surface the chip bonding portion 22B is made partly rougher as shown in FIGS. 8 and 9. The partly rougher chip bonding portion can be easily manufactured if chemical etching is performed when the die is produced. As shown in FIG. 10, the head chip 21 is bonded by an adhesive agent 60 to the bonding portion 22B where the surface roughness is made rougher. After that, a wire is wound around the head chip 21 as mentioned above, and the end of the wire is connected to the terminal strip formed on a surface (the opposite surface to the illustrated surface) of the base portion 22A.

As mentioned above, where the surface roughness of the bonding portion 22B to which the head chip 21 is bonded is made rougher, the head chip bonding strength becomes stronger, so that the magnetic head can be mass-produced and that the conductivity between the head chip and the head base is increased. Thus, the magnetic head having stronger mechanical strength and superior electric efficiency can be manufactured.

What is claimed is:

1. A magnetic head comprising:

a die-molded rotatable head base formed from a conductive resin material and presenting an outer surface defining a housing envelope formed in said head base, said head base having an aperture therethrough generally defining an axis of rotation thereof; and a head chip comprising a magnetic substance and having at least a portion thereof buried within said housing envelope so that said magnetic substance is in contact with said outer surface defining said housing envelope in a manner which secures said head chip to said head base, said housing envelope formed in said head base defining a relative position of said head chip with respect to said axis of rotation of said head base.

2. The magnetic head as claimed in claim 1, wherein the conductive resin material comprises carbon and synthetic resin.

3. A magnetic head assembly comprising:

a rotary drum; and a magnetic head fixed to said drum, said magnetic head including (i) a die-molded rotatable head base formed from a conductive resin material and presenting an outer surface defining a housing envelope formed in said head base, said head base having an aperture therethrough generally defining an axis of rotation thereof and (ii) a head chip comprising a magnetic substance and having at least a portion thereof buried within said housing envelope so that said magnetic substance is in contact with said outer surface defining said housing envelope in a manner which secures said head chip to said head base, said housing envelope formed in said head base defining a relative position of said head chip with respect to said axis of rotation of said head base.

4. The magnetic head assembly as claimed in claim 3, wherein a dummy base formed from conductive resin materially is integrally formed with said die-molded head base for rotatively balancing the rotary drum.

5. A magnetic head including:

a die-molded rotatable head base formed from a conductive resin material and presenting an outer surface defining a plurality of housing envelopes formed in said base, said head base having an aperture therethrough generally defining an axis of rotation thereof; and a plurality of head chips each comprising a magnetic substance and each having at least a portion thereof buried within a respective one of said housing envelopes so that the magnetic substance of each of said head chips is in contact with said outer surface defining said housing envelopes in a manner which secures said head chips to said head base, said housing envelopes formed in said head base defining relative positions of said head chips with respect to said axis of rotation of said head base.

6. The magnetic head as claimed in claim 5, wherein the conductive resin material comprises carbon and synthetic resin.

7. A magnetic head assembly comprising:

a rotary drum; and a magnetic head fixed to said drum, said magnetic head including (i) a die-molded head base formed from a conductive resin material and presenting an outer surface defining a plurality of housing envelopes formed in said head base, said head base having an aperture therethrough generally defining an axis of rotation thereof, and (ii) a plurality of head chips each comprising a magnetic substance and each having at least a portion thereof buried within a respective one of said housing envelopes so that the magnetic substance of each of said head chips is in contact with said outer surface defining said housing envelopes in a manner which secures said head chips to said head base, said housing envelopes formed in said head base defining relative positions of said head chips with respect to said axis of rotation of said head base.

8. The magnetic head assembly as claimed in claim 7, wherein a dummy base formed from conductive resin material is integrally formed with said die-molded head base for rotatively balancing the rotary drum.

9. A method for making a magnetic head comprising the steps of:

placing at least one head chip at a predetermined position within a die-mold, said at least one head chip being made of a magnetic substance;

injecting a conductive resin material into the die-mold to form a head base; and solidifying said conductive resin material to i) form an aperture within said head base, and ii) form a housing envelope about said at least one head chip placed in the die-mold, said at least one head chip being positioned relative to the aperture according to the predetermined position at which it is placed in the die-mold.

10. A method for manufacturing a magnetic head having a plurality of head chips at least partially buried in respective housing envelopes formed in a rotatable head base at functionally operative positions thereof, said method comprising the steps of:

placing said plurality of head chips at relative positions within a die-mold which correspond to functionally operative positions said head chips are to assume with respect to said head chips when disposed on said rotatable head base, said head chips being formed from a magnetic substance;

providing a conductive resin material into the die-mold; and solidifying said conductive resin material within said die-mold to form said rotatable head base with said plurality of housing envelopes, said housing envelopes being solidified about said head chips so as to maintain said head chips at said functionally operative positions on said rotatable head base.

11. A method for manufacturing a magnetic head having a rotatable head base and at least one head chip disposed within a housing envelope formed in said rotatable head base, said method comprising the steps of:

providing a conductive resin material into a die-mold;

then solidifying said conductive resin material to form a head base including at least one housing envelope formed therein; and then securing a head chip within each said at least one housing envelope by wedging the head chip therein.

12. A method for manufacturing a magnetic head having a rotatable head base and at least one head chip disposed within a housing envelope formed in said rotatable head base, said method comprising the steps of:

providing a conductive resin material into a die-mold;

solidifying said conductive resin material to form a head base including at least one housing envelope formed therein;

placing a respective head chip in each said at least one housing envelope; and heating the solidified conductive resin in the vicinity of said at least one housing envelope so that said resin adheres to each respective head chip disposed in said at least one housing envelope.

* * * * *